US007559057B2

(12) United States Patent
Castelli et al.

(10) Patent No.: US 7,559,057 B2
(45) Date of Patent: Jul. 7, 2009

(54) ALIGNMENT AND GENERALIZATION OF DEMONSTRATED PROCEDURE TRACES

(75) Inventors: Vittorio Castelli, Croton-on-Hudson, NY (US); Lawrence D. Bergman, Mount Kisco, NY (US); Tessa A. Lau, New York, NY (US); Daniel A. Oblinger, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 10/729,736

(22) Filed: Dec. 5, 2003

(65) Prior Publication Data

US 2005/0125782 A1    Jun. 9, 2005

(51) Int. Cl.
*G06F 9/45* (2006.01)
*G06E 1/00* (2006.01)
*G06N 5/02* (2006.01)

(52) U.S. Cl. .................. 717/159; 717/106; 717/154; 706/16; 706/47

(58) Field of Classification Search ................ 717/128, 717/133, 131, 151, 104, 125
See application file for complete search history.

(56) References Cited

U.S. PATENT DOCUMENTS 5,644,652 A * 7/1997 Bellegarda et al. .......... 382/186
6,009,452 A * 12/1999 Horvitz ...................... 718/102
6,021,403 A * 2/2000 Horvitz et al. ............... 706/45
6,948,157 B2 * 9/2005 Larsson et al. .............. 717/139
7,000,187 B2 * 2/2006 Messinger et al. .......... 715/705
2004/0130572 A1 * 7/2004 Bala .......................... 345/762

OTHER PUBLICATIONS

"Programming by Demonstration: a Machine Learning Approach", Tessa Lau, 2001. Online retrieved at <www.tlau.org/research/>.*
"Programming by demonstration: A machine learning approach to support skill acquisition for robots", Dillmann et al., 1996, pp. 1-23. Online retrieved at <www.springerlink.com/index/f471m35173113763.pdf>.*
"Programming by demonstration using version space algebra", Lau et al., Oct. 2001, pp. 1-60. Online retrieved at <http://www.cs.washington.edu/homes/pedrod/papers/mlj02.pdf>.*
"SCIA 2003 Tutorial: Hidden Markov Models", Roweis, Jun. 2003, pp. 1-10. Online retrieved at <http://www.cs.toronto.edu/~roweis/notes/scia03h.pdf>.*
Hui-Ling Lou, Implementing the Viterbi Algorithm IEEE Signal Processing Magazine, pp. 42-52, Sep. 1995.
Yoshua Benjio, et al. Input-Output HMM's for Sequence Processing IEEE Transactions on Neural Networks, vol. 7., No. 5. pp. 1231-1249, Sep. 1996.

* cited by examiner

*Primary Examiner*—Tuan Q Dam
*Assistant Examiner*—Thuy Dao
(74) *Attorney, Agent, or Firm*—F. Chau & Associates, LLC

(57) ABSTRACT

A method and system for generating one or more Computer-executable procedures simultaneously learns from a collection of procedure instances recorded by different users on a variety of computers aligning multiple traces and using the aligned traces to generalize.

16 Claims, 2 Drawing Sheets

ALIGNMENT AND GENERALIZATION OF DEMONSTRATED PROCEDURE TRACES

BACKGROUND OF THE INVENTION

1. Field of the Invention

The present invention relates to computer-executable procedures, and, more particularly, to construction of computer-executable procedures using examples.

2. Description of the Related Art

A common use of computer systems is the execution of procedures. As used herein, the term "procedure" refers to a collection of computer-executable operations (i.e., any transformation of data or of visible appearance of the screen) that satisfy the following constraints:

(1) A procedure has a specific goal.

(2) The procedure is performed by an individual at different points in time or is performed at least once by a number of individuals.

(3) The procedure can have a limited amount of "structural" variability.

(4) Individual steps of a procedure can have a limited amount of variability, and can be performed on different objects in different instantiations of the procedure.

It is clear that a specific task such as copying a specific file from a directory to another is generally not a "procedure" unless the task is either repeatedly performed by the same individual or commonly performed by a variety of individuals. Similarly, answering electronic mail, writing a technical paper, debugging a program, playing a video game, and the like, do not fall under the definition of "procedure" as described above because such activities have (1) generic rather than specific goals, (2) very high structural variability, and (3) very high variability of individual steps.

Tasks such as scheduling a meeting (e.g., reserving a a conference room and the appropriate audio/visual equipment, sending notes to the invited people, and requesting refreshments), submitting a travel request, requesting a clearance for a publication, and requesting reimbursement for miscellaneous expenses are "procedures," as defined above, because they (1) have a well-defined, narrow goal, (2) are commonly performed in the same manner by multiple individuals across an organization, (3) have limited structural variability, and (4) have limited variability of individual steps, although some details may vary across different executions of the same procedure (e.g., the date of a meeting, the list of invited people, and the quantity of refreshments may be variable in scheduling a meeting).

Other tasks that fall under the aforementioned definition of "procedure" include installing and upgrading software applications, troubleshooting a specific computer system problem (e.g., fixing a network card of a portable computer), configuring a software installation, and tuning a collection of applications to achieve a desired goal (e.g., configuring a database system to minimize the response time to specific types of transactions). A simple test to determine whether a task falls under the aforementioned definition of "procedure" is as follows: If it is possible with current technology to write a program that executes a desired task with limited intervention of the user and the desired task is commonly performed, then the desired task is a procedure; otherwise, it is not.

It should be noted that software applications are designed to provide functionalities to perform specific steps of a procedure, rather than the procedure as a whole. Accordingly, a procedure may be performed by one or more software applications.

When a procedure is performed by a sufficiently large number of users, the procedure is commonly coded as a computer program—either using a traditional programming language (e.g., Java, C++) or a scripting language (e.g., Perl). This is the case, for example, for installing software applications or installing/configuring hardware devices. The limitation of this approach, however, is a high cost of developing, testing, and maintaining a program for each procedure. Therefore, typically only selected, well-understood procedures intended for a wide audience are actually encoded as a programs.

At the other end of the spectrum, individual users can rely on macro recorders to perform repetitive tasks. A macro recorder is a computer program that remembers a sequence of actions performed by a user and is capable of repeating the sequence. Macro recorders may exist as a part of software applications (e.g., free editor EMACS (Editing MACroS) generally have a built-in macro recorder), in which case they are limited to recording and repeating operations performed within the application to which they belong. Macro recorders may also exist as standalone programs that interact with the GUI (Graphical User Interface) of other applications of the OS (Operating System). The main limitation of macro recorders is that they execute verbatim the same operations that are recorded. That is, they are unable to abstract from the specific observed steps to generic operations (i.e., macro recorders are unable to "generalize").

Because macro recorders do not generalize, they can rarely be used to encode executable procedures that can be disseminated widely. That is, the small differences in how individual computers are configured make recorded macro extremely brittle and error prone.

SUMMARY OF THE INVENTION

In one aspect of the present invention, a method for generating one or more computer-executable procedures is provided. The method contains steps for recording at least one trace of at least one instance of a procedure; simultaneously performing an alignment and generalization of the at least one trace; and generating the one or more computer-executable procedures consistent with the alignment and generalization.

In another aspect of the present invention, a machine-readable medium having instructions stored thereon for execution by a processor to perform a method for generating one or more computer-executable procedures is provided. The method contains steps for recording at least one trace of at least one instance of a procedure; simultaneously performing an alignment and generalization of the at least one trace; and generating the one or more computer-executable procedures consistent with the alignment and generalization.

In yet another aspect of the present invention, a system for generating one or more computer-executable procedures is provided. The system contains means for recording at least one trace of at least one instance of a procedure; means for simultaneously performing an alignment and generalization of the at least one trace; and means for generating the one or more computer-executable procedures consistent with the alignment and generalization.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
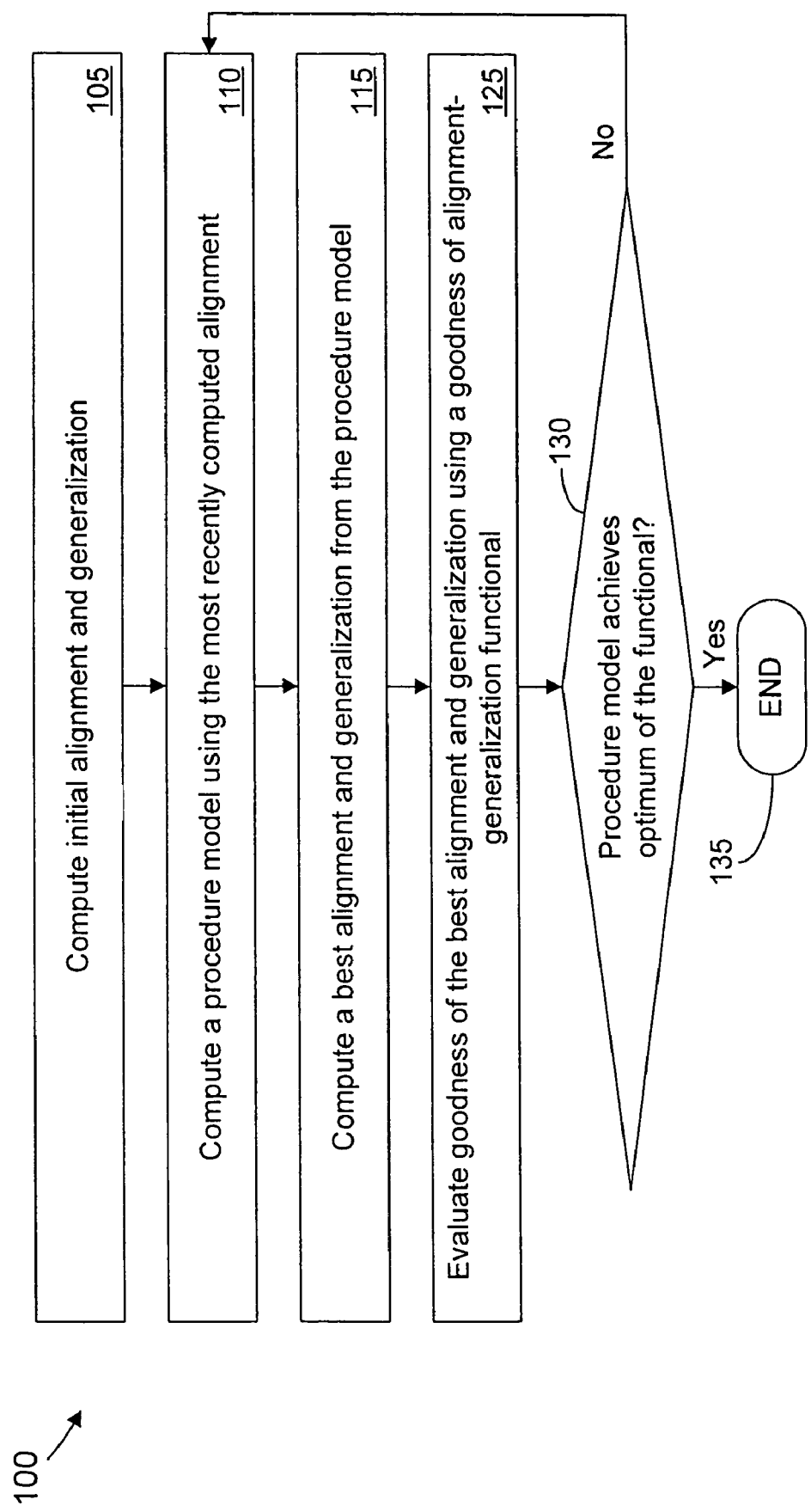
FIG. 1 shows an iterative method of constructing a procedure model using simultaneous alignment and generalization by optimizing a functional that captures the goodness of alignment-generalization, in accordance with one embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachers herein, one of ordinary skill in the related art will be able to contemplate these and similar implementations of the present invention.

As explained in greater detail below, the present invention provides a method and system for combining multiple examples of a procedure to produce a computer-executable procedure by simultaneous alignment and generalization of the multiple examples. It is noted that the terms "example," "trace," and "procedure instance" are used interchangeably herein. The present invention is based on the concept of programming-by-demonstration. A brief overview of programming-by-demonstration will now be provided.

Programming-by-demonstration is traditionally a discipline that seeks to automatically construct programs by providing a set of input-output examples. An example of an "input-output example" is as follows. Denote [(a,b),c] as an input-output example, where (a,b) is the input and c is the output. Consider now the following input-output example: [(1,2),3], [(2,1),3]·[(3,5),8]. Programming-by-demonstration would infer the following program: c=a+b.

The vast majority of programming-by-demonstration efforts have been in learning the functional dependence between the inputs and the outputs. That is, how the inputs and the outputs are related and what causes the transformation that given the observed inputs produces the observed outputs. In simple terms, most programming-by-demonstration techniques are concerned with the question "what?".

However, the present invention is primarily concurred with learning procedural knowledge. That is, learning the steps required to achieve a specific goal. In simple terms, the present invention is concerned with the question "how?".

A small number of programming-by-demonstration systems have addressed learning with procedural knowledge. These systems construct procedures by observing an initial execution of a procedure (i.e., "procedure instance") and infer an initial executable model based on the initial execution. As used herein, the term "executable model" refers to an abstraction of a procedure that can be executed. As a procedure comprises a number of executable steps, so does the executable model. When the procedure is to be executed again, the system loads the executable model and at each step provides the user with possible operations. The user selects a correct operation, and the system modifies the executable model accordingly. Hence, with the help of the user, the system generalizes the procedure. Eventually, after a sufficient number of modifications, the user can decide that the system has learned the correct operation. If so, the user can allow the system to execute the correct operation accordingly.

The present invention overcomes the difficulties described above. The present invention can simultaneously learn from a collection of procedure instances recorded by different users on a variety of computers. It is noted that the term "procedure instance," as used herein, denotes a specific execution of a procedure by a user. In particular, the present invention provides a method and system that both aligns multiple traces and uses the aligned traces to generalize.

Sophisticated sequence alignment algorithms exists in other fields, such as computational biology. Such alignment algorithms are designed to efficiently search through many possible alignments of the elements of multiple variable-length sequences to identify the alignment that minimize a given fixed cost function. The problem is that these alignment algorithms only work if no generalization is required. That is, they align the sequences in verbatim.

In the present invention, the existence of a device or a computer program (executed by a processor-based machine, such as a computer) that observes users performing instances of procedure as well as the state and behavior of the computer system at which the procedure is performed is assumed. Such a device or computer program should produce a description of the interaction between the user and the device or computer program that can be stored and/or transmitted. As used herein, the term "procedure trace," or, more simply, "trace," denotes this storable and/or transmittable description. In other words, the procedure trace is a product of recording one instance of a procedure performed by a user. One of ordinary skill in the art would recognize that such device or computer program can be written to operate on a modern operating system, such as Microsoft Windows.

In a preferred embodiment, a procedure trace contains: (1) a description of the graphical user interface ("GUI") prior to the stating point of the procedure instance; (2) a low-level description of the actions performed by the user while executing the procedure instance (i.e., the sequence of keyboard and mouse clicks); and (3) a description of changes to the GUI while executing the procedure instance (e.g., changes to the windows with which the user interacts, creation of new windows, destruction of existing windows, etc.). Other variations of the procedure trace are possible, as contemplated by those skilled in the art.

In the present invention, it is also assumed that each procedure trace is segmented into a sequence of steps. It would be clear to one of ordinary skill in the art that the segmentation can be performed at different levels of abstraction. At the lowest level, the trace can be segmented into elementary user actions (e.g., mouse click and/or keyboard input sequences). At a higher level of abstraction, the trace can be segmented into simple user actions (e.g., double-click on an icon, type in a user name, etc.). Segmentation at even higher levels of abstraction is also possible (e.g., saying "launch Lotus Notes and log on," saying "install DB2," etc.). One of ordinary skill in the art would appreciate that the embodiments of the present invention do not depend on the specific level of abstraction of the segmentation.

A procedure executable model is constructed by simultaneous alignment and generalization of a collection of traces constructed as described above. The term "alignment," as used herein, refers to identifying sets of steps that are equivalent once generalized. The term "generalization," as used herein, refers to producing an abstract description that may include one or more ways of explaining (e.g., predicting) the differences between the individual steps belonging to the set. For example, each user from a group of users would generally type his or her own unique user identification in a "username" field of a log-in dialog. Because each user identification is unique, without generalization it may be inferred that each action of typing in a user identification is separate and distinct. Generalizing, however, infers that the unique strings typed in the "username" field, although different, actually refer to a generic set of steps for typing in a unique user identification.

Further adding to the above example, consider a procedure where a user logs onto two different web sites at two different points of the procedure. Generalization may infer that at both points, the steps of inputting a username and a password in a log-in dialog box correspond to logging onto the web site. However, the two actions of logging on (i.e., inputting a username and inputting a password) may be considered to be two separate and distinct portions of the procedure. Therefore, in accordance with this example, the steps associated with inputting the username and password should not be aligned. As previously stated, aligning refers to identifying steps that are equivalent once generalized. In this example, the steps of inputting a username may be aligned, and the steps of inputting a password may be aligned. However, the steps of logging onto a web site (i.e., the combined steps of inputting a username and password) may not be aligned because they are not equivalent. As described in greater detail below, an iterative method is proposed herein that refines alignment and generalization at each iteration. The iterative method decides whether alignment is appropriate without user input.

It should be noted that a set of aligned steps can contain steps from multiple traces, as well as multiple steps from individual traces. For example, when purchasing books using an e-commerce application, the same sequence of operations can be performed on different books by a user. That is, the user would first locate the desired books and then add them to the shopping cart. Although a different book is selected each time, the steps for adding each book can be aligned. Similarly, when learning from multiple traces of users purchasing books, the steps of adding a each book can still be aligned, irrespective of whether they come from a single or multiple traces.

Known methods for simultaneous alignment and generalization are performed by considering all possible alignments and selecting the alignment where generalization provides the most predictive executable procedure model, as determined, for example, with any of a variety of well-known methods for evaluating the predictive capabilities of a procedure model. This embodiment, however, works in practice for only very simple problems. Consider a simple example with two traces. One trace contains two steps and another trace contains three steps. Even in such a simple example, there are already at least 48 distinct possible alignments of the two traces. This number can grow extremely fast.

The present invention performs simultaneous alignment and generalization by defining a functional that computes a goodness of a given alignment and generalization of a set of traces, and using optimization methods for finding an alignment that optimizes the functional.

The following descriptions of the Figures assume the existence of a collection of procedure traces, which are known as "training sets" or "training traces." The "training trace," as used herein, denotes a trace that is used for training. That is, a training trace denotes a recorded trace of a procedure instance used for inferring an executable procedure model, as explained in greater detail below.

Referring now to FIG. 1, a method 100 of constructing a procedure model using simultaneous alignment and generalization, in accordance with one embodiment of the present invention, is shown. As illustrated in FIG. 1, the procedure model is constructed by optimizing a functional that captures the goodness of alignment and generalization. An initial alignment of two or more traces is computed (at 105) and one or more aligned steps of the traces are generalized (at 105). As used herein, the terms "generalize" and "compute a generalization" are used interchangeably. One method of computing an initial alignment and generalization includes, but is not limited to, performing a random alignment of the one or more traces. Th initial alignment is used to compute (at 110) a procedure model. One of ordinary skill in the art would appreciate that there are different ways of computing a procedure model, which are strictly dependent on the characteristics of the specific class of models used to describe the procedure. A specific example is described later in this patent application with reference to FIG. 2, where the class of procedure models is the class of Hidden Markov Models. Training traces are aligned to the procedure model. A best alignment and generalization is computed from the procedure model and a measure of goodness of alignment-generalization is computed for the best alignment and generalization (at 115). The possible alignment: are evaluated (at 125) using a goodness of alignment-generalization functional. If the evaluation (at 125 determines (at 130) the procedure model computed (at 110) achieves an optimum of the functional , the method 100 terminates (at 135). That is, the value of the goodness of alignment-generalization functional is either the maximum possible (if larger values denote better alignment/generalization) or the minimum possible (if smaller values denote better alignment/generalization). For example, if the alignment/ generalization is measured using the rate at which the procedure steps are correctly predicted, then larger values denote better alignment/generalization. If the alignment/generalization is measured using the rate at which the procedure steps an incorrectly predicted, then smaller values denote better alignment-generalizations. Otherwise, the method 100 computes (at 110) the procedure model again.

Figure 2:
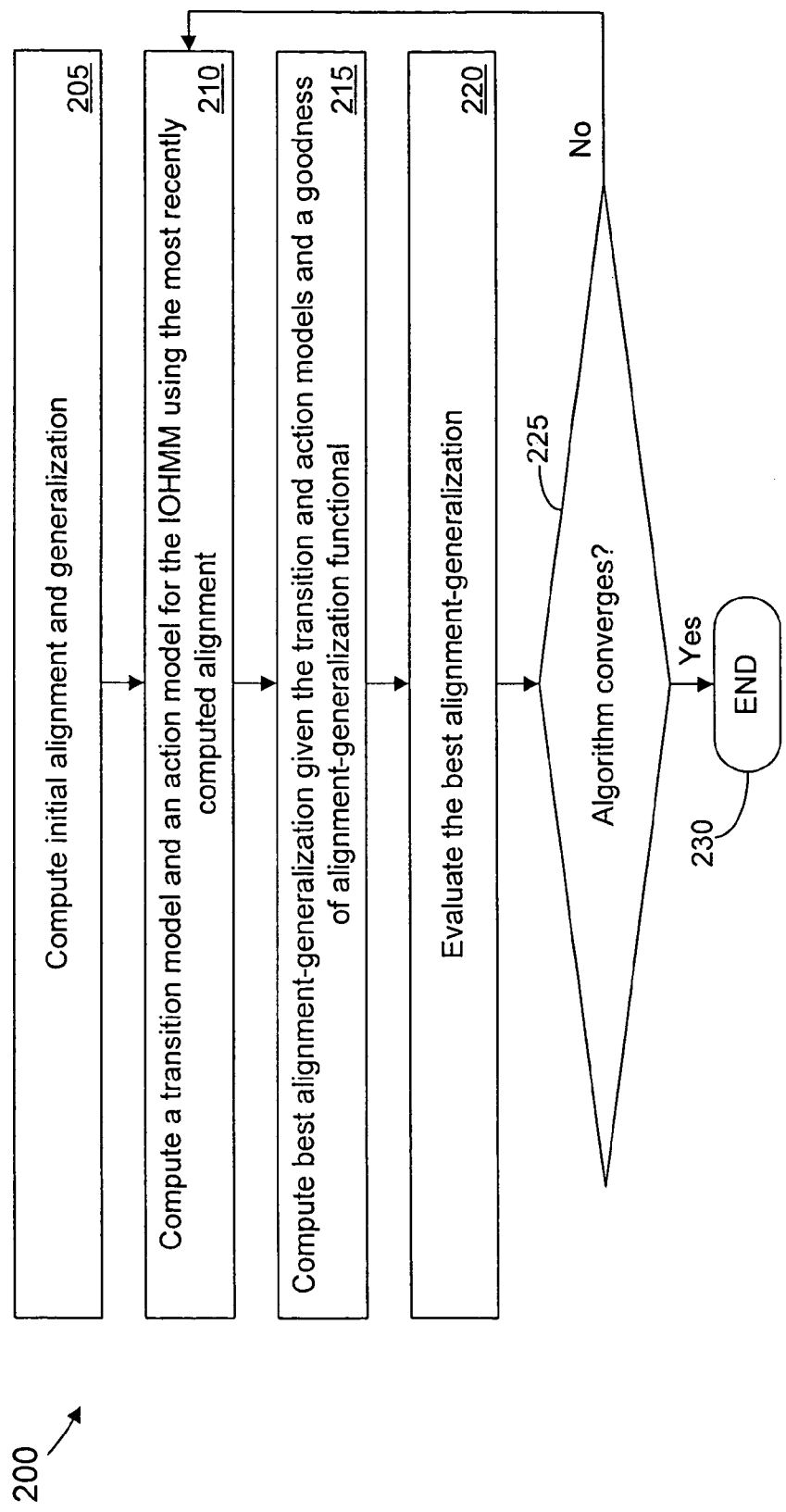
FIG. 2 shows the iterative method of FIG. 1, wherein the procedure model is a probabilistic model based on Markovian assumptions, in accordance with one embodiment of the present invention.

Referring now to FIG. 2, a method 200 is illustrated wherein the procedure model described in FIG. 1 is a probabilistic model based on Markovian assumptions. Each step of the procedure model is conditionally independent of the steps preceding the previous step, given the previous step. More specifically, the procedure model is represented by a finite number of model states (i.e., "nodes"). Procedure models (like all models) are either deterministic or probabilistic. A probabilistic model is a model where each step of the procedure is modeled as a random variable, whereas a deterministic model is a model where steps are not modeled as random variables. It should be noted that the model states are distinguished from states of the computer system at each step of the procedure model. The state of the procedure model describes what part of the procedure is currently being executed, whereas the state of the computer system describes the properties of the computer and its user interface. The alignment of a trace step on the procedure model is represented by a probabilistic assignment of the step to the procedure nodes, namely by a probability distribution over the nodes describing the probability that the step in question corresponds to each of the nodes. The Markovian assumption means that the current probabilistic assignment depends only on the system state and user action for the current step, and the probabilistic assignment of the previous step. More precisely, the current probabilistic assignment is conditionally independent of all the assignments, system states, and user actions of the steps before the previous steps, given the probabilistic assignment of the previous step, and the system state and user action for the current step.

If generalization is ignored, the described model is equivalent to Input-Output Hidden Markov Model ("IOHMM"), as taught by Y. Bengio and P. Frasconi, "Input-Output HMM's for Sequence Processing," *IEEE Trans. Neural Networks*, 7(5):1231-1249, September 1996. More specifically, if the state of the computer system at a specific step is interpreted as input and the user action as output, then each model node n has two associated functions. The first is a transition function, which yields a probabilistic assignment of the current step over the nodes given the input at the current step and that the previous node is n. The second is an output function, which yields a probabilistic assignment of the current user action over all possible user actions given the input at the current user action over all possible user actions given the input at the current step and that the current node is n. The Baum-Welch algorithm is then used to find a procedure model (i.e., a set of transition and output functions) for which the log-likelihood of the training data is maximized.

It would be clear to one of ordinary skill in the art that the IOHMM does not incorporate a goodness of alignment-generalization functional. FIG. 2 shows a specialization of the embodiment of FIG. 1 to the case where the model is an extension of the IOHMM to include a goodness of alignment-generalization functional. An initial alignment and generalization is computed (at 205). Given the initial alignment, the transition and action models of the IOHMM are computed (at 210). The best alignment-generalization is computed (at 215) given a transition model and an action models computed (at 210) and a goodness of alignment-generalization functional. The best alignment-generalization is evaluated (at 220). One of ordinary skills in the art would appreciate that step 215 is in general highly dependent on the class of models used for the transition model, the class of models used for the action model, and the goodness-of-alignment-and-generalization functional. In this preferred embodiment, if the action and transition models are general conditional probabilities given the HMM input, and if the functional is the likelihood, then it would be apparent to one of ordinary skill in the art that the computation of step 215 can be performed using the standard Viterbi Algorithm, which can be implemented, for example, as taught in Hui-Ling Lu, "Implementing the Viterbi Algorithm," *IEEE Signal Processing Magazine*, 12(5):42-52, September 1995. A decision is made (at 225) whether the algorithm has converged. If the algorithm has converged (at 225), the algorithm terminates (at 230). If not, the best alignment-generalization is computed (at 210) again. One of ordinary skill in the art would appreciate that the convergence (or lack thereof) of the algorithm can be measured in a variety of ways, as widely described in the existing art dealing with iterative algorithms.

In the spirit of the current invention, any of a variety of functionals measuring the goodness of alignment-generalization can be used in the embodiments described above. In a preferred embodiment, the functional is constructed as follows:

(1) call $t_{ij}$ the $j^{th}$ step of the $i^{th}$ training trace ($t_{ij}=(s_{ij}, a_{ij})$, where $S_{ij}$ is the system state at step j and trace i was acquired);

(2) let T be the total number of training traces;

(3) let $g(t_{ij}, M)$ be equal to 1 if the model M generalizes correctly the step $t_{ij}$, and equal to 0 otherwise;

(4) let e(t.sub.ij, M) be equal to 1 if the action a.sub.ij is predicted correctly by the model given (t.sub.i1, . . . ,t.sub.i(j−1)) and s.sub.ij, and let f(.,.) be a monotonically increasing function with two arguments. The function f(g(tij,M),a(tij, M)) can then be used as goodness of alignment-generalization measure. A simple example is f(g)(t.sub.ij, M), e(t.sub.ij, M)=g(t.sub.ij, M)+e(t.sub.ij, M). Where alignment and generalization are equally weighted or more generally, f(g(t.sub.ij, M), e(t.sub.ij, M)=.alpha.g(t.sub.ij, M)+(1−.alpha.)(e(t.sub.ij, M)), where .alpha. is a number between 0 and 1. The larger the value of .alpha., the bigger the importance the goodness of generalization over the goodness of alignment, while the smaller the value of .alpha., the bigger the importance of the goodness of alignment over the goodness of generalization.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for generating one or more computer-executable procedures, comprising the steps of:

recording at least one trace of at least one instance of a procedure, wherein the at least one trace comprises a plurality of steps;

simultaneously performing an alignment and generalization of the plurality of steps, wherein the alignment of the plurality of steps identifies a set of steps in the plurality of steps that are equivalent once generalized, and wherein the generalization of the plurality of steps predicts differences between individual steps belonging to the identified set of steps in the plurality of steps and determines that the identified set of steps perform a distinct action in the procedure;

determining a procedural model based on the alignment;

computing a set of possible alignments and generalizations based on the procedural model;

selecting an updated alignment and an updated generalization from the set of possible alignments and generalizations according to an alignment-generalization functional that determines a rate at which the steps of the procedure are correctly predicted for the set possible alignments and generalizations; and generating the one or more computer-executable procedures consistent with the updated alignment and the updated generalization.

2. The method of claim 1, wherein the alignment-generalization functional selects an alignment having a greatest number of correctly predicted steps according to a procedure model.

3. The method of claim 1, wherein the alignment-generalization functional selects a generalization having a greatest number of correctly generalized steps according to a procedure model.

4. The method of claim 1, wherein the alignment-generalization functional is a monotonically increasing function of an alignment functional and a generalization functional.

5. The method of claim 4, wherein the monotonically increasing function selects the alignment and the generalization from the set of possible alignments and generalizations that maximizes a linearly increasing function of the alignment functional and the generalization functional.

6. The method of claim 1, wherein the alignment-generalization functional is maximized using an optimization technique.

7. The method of claim 6, further comprising applying the optimization technique iteratively.

8. The method of claim 7, wherein the optimization technique is a gradient-descent technique.

9. The method of claim 1, wherein simultaneously performing an alignment and generalization of the at least one trace further comprises the steps of:
computing an initial alignment and generalization of the at least one trace;
generating a procedure model of the initial alignment; and
computing a best alignment and generalization of the procedure model.

10. The method of claim 9, further comprising the step of:
repeating the steps of determining the initial alignment, generating the procedure model, and determining the best alignment until a local optimum is detected.

11. The method of claim 9, wherein generating a procedure model of the initial alignment comprises generating a Hidden Markov Model of the initial alignment.

12. The method of claim 11, wherein generating a Hidden Markov Model of the initial alignment comprises generating an Input/Output Hidden Markov Model of the initial alignment.

13. The method of claim 1, wherein simultaneously performing an alignment and generalization of the at least one trace further comprises the steps of:
determining an initial alignment and generalization of the at least one trace;
generating a transition model and an action model of the initial alignment and generalization; and
determining a best alignment of the transition model and the action model.

14. The method of claim 13, wherein further comprising the step of:
repeating the steps of determining the initial alignment, generating the transition model and the action model, and determining the best alignment until a convergence is detected.

15. The method of claim 13, wherein generating a transition model and an action model of the initial alignment and generalization comprises generating a transition model for at least one node and an action model for the at least one node.

16. A machine-readable medium having instructions stored thereon for execution by a processor to perform a method for generating one or more computer-executable procedures, comprising the steps of:
recording at least one trace of at least one instance of a procedure, wherein the at least one trace comprises a plurality of steps;
simultaneously performing an alignment and generalization of the plurality of steps, wherein the alignment of the plurality of steps identifies a set of steps in the plurality of steps that are equivalent once generalized, and wherein the generalization of the plurality of steps predicts differences between individual steps belonging to the identified set of steps in the plurality of steps and determines that the identified set of steps perform a distinct action in the procedure;
determining a procedural model based on the alignment;
computing a set of possible alignments and generalizations based on the procedural model;
selecting an updated alignment and an updated generalization from the set of possible alignments and generalizations according to an alignment-generalization functional that determines a rate at which the steps of the procedure are correctly predicted for the set possible alignments and generalizations; and
generating the one or more computer-executable procedures consistent with the updated alignment and the updated generalization.

* * * * *